(12) United States Patent
Guthrie et al.

(10) Patent No.: US 6,963,844 B1
(45) Date of Patent: Nov. 8, 2005

(54) METHOD FOR QUALIFYING DIE MATERIAL AND TESTING DIES

(75) Inventors: Brad D. Guthrie, Livonia, MI (US); Todd Henry Cleaver, Grosse Ile, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/544,321

(22) Filed: Apr. 6, 2000

(51) Int. Cl.$^7$ .................................. G06F 17/60
(52) U.S. Cl. ................. 705/1; 73/866; 702/82
(58) Field of Search ............... 705/1; 73/866, 73/81, 789

(56) References Cited

U.S. PATENT DOCUMENTS

| | | | | |
|---|---|---|---|---|
| 5,220,827 A | * | 6/1993 | Friedman | 73/81 |
| 5,463,896 A | * | 11/1995 | Abbate et al. | 73/81 |
| 5,737,494 A | * | 4/1998 | Guinta et al. | 395/10 |
| 5,737,581 A | * | 4/1998 | Keane | 703/6 |
| 5,765,138 A | * | 6/1998 | Aycock et al. | 705/7 |
| 6,140,643 A | * | 10/2000 | Brown et al. | 702/28 |
| 6,267,011 B1 | * | 7/2001 | Kurtz et al. | 73/789 |

FOREIGN PATENT DOCUMENTS

| | | | | |
|---|---|---|---|---|
| JP | 406299298 A | * | 10/1994 | C22C 38/00 |

OTHER PUBLICATIONS

Moh's scale of Mineral Hardness from American Federation of Mineralogical Societies web site (http://www.amfed.org/t_mohs.htm) Sep. 1999.*

Selection and use of ISO 9000, from the website www.iso.ch 1998, entire document.*

CRC for Alloy & Solidification Technology; Guidelines for the Acceptance and Heat Treatment of H13 Die Steel; 1996.

Franz Jeglitsch, Reinhold Ebner, Harald Leitner; Proceedings of the 5$^{th}$ International Conference on Tooling; Paper 1; Sep. 29-Oct. 1, 1999.

Franz Jeglitsch, Reinhold Ebner, Harald Leitner; Proceedings of the 5$^{th}$ International Conference on Tooling; Paper 2; Sep. 29-Oct. 1, 1999.

Franz Jeglitsch, Reinhold Ebner, Harald Leitner; Proceedings of the 5$^{th}$ International Conference on Tooling; Paper 3; Sep. 29-Oct. 1, 1999.

R. Breitler, J. Kaszynski; The Properties of Hot Work Die Steels; Cleveland T99-101.

John F. Wallace, David Schwam; Control of Die Steels & Processing to Extend Die Life; Case Western Reserve University; Cleveland T99-102.

(Continued)

*Primary Examiner*—John G. Weiss
*Assistant Examiner*—Michael J. Fisher
(74) *Attorney, Agent, or Firm*—David B. Kelley

(57) ABSTRACT

A method (10) for acquiring material for use within a die and for determining whether a die has certain characteristics which would allow the die to have a relatively long operating life. The method (10) requires that a suppler of a die provide certain material which is analyzed to determine whether the supplied material has a certain toughness. If the material has the requisite toughness, a material signature is created and used to evaluate further materials and dies produced and/or provided by the supplier.

6 Claims, 1 Drawing Sheet

OTHER PUBLICATIONS

John Finn; High Yield Heat Treatment for Die Cast Tooling; GM Powertrain, Bedford, Indiana USA; Cleveland T99-103.

John W. Smythe, Michael M. Antony; Thermal Fatigue Behavior of Low Carbon High Strength Alloys; Allvac, and Allegheny Teledyne Company Monroe, NC; Cleveland T99-104.

Patrick Roche, Martin Beaton, Bengt Klarenfjord, Odd Sandberg; Toughness & Ductility: Your Die Needs Both; Minneapolis T97-082.

Bernd Gehricke, Bengt Klarenfjord, Alfred Schindler, Ingolf Schruff; Relation between Microstructure and Ductility of Hot-Work Tool Steels H-11 and H-13—Presentation of New Acceptance References for Microstructures; Indianapolis T95-103.

Corwyn M. Berger, John Finn; The Effect of Annealed Microstructure on the Impact Toughness of Premium H-13 Die Steel; Indianapolis T95-105.

Michael L. Schmidt; Effect of Austenitizing Temperature on the Structure and Mechanical Property Behavior of Laboratory Treated Specimens and Large Section Sizes of H-13 Tool Set; Paper No. G-T87-006; Die Casting Congress and Exposition May 11-14, 1987.

Johann A. Stuhl, Rudolf Breitler; Serivce Properties and Optimal Heat Treatment Technology for Die Casting Dies; Paper No. G-T87-008; Die Casting Congress and Exposition May 11-14, 1987.

William Roberts, Lars-Ake Norstrom; Premium Die Steel and Heat Treatment Solutions for the 1990's; Paper No. G-T87-009; Die Casting Congress and Exposition May 11-14, 1987.

* cited by examiner

METHOD FOR QUALIFYING DIE MATERIAL AND TESTING DIES

FIELD OF THE INVENTION

This invention generally relates to a method for qualifying material used to construct an object and to a method for testing the quality of material used in the object and more particularly, to a method for qualifying die material and to a method for testing the quality of heat-treated steel used in the construction of a die.

BACKGROUND OF THE INVENTION

Dies are used to manufacture and create a wide variety of parts and components, such as those parts and components which are used within a vehicle. Typically these dies include a cavity which receives relatively hot or molten material. As the material cools within the die, the material is solidified and is formed into the shape of the die cavity which generally conforms to the shape of the desired part or component which is to be produced. The solidified part or component is then removed from the die and may be used within an assembly, such as a vehicle.

The continuous and cyclic heating and cooling of these dies causes structural fatigue and other structural degradation, requiring these dies to be relatively frequently replaced. Since these dies are relatively expensive, such frequent replacement is relatively costly. Such frequent die replacement also undesirably interrupts the overall manufacturing process, thereby further increasing overall replacement cost.

It is therefore highly desirable to produce and utilize dies having respective "operating lives" which are relatively long (i.e., which may be used for a relatively long period of time without experiencing structural fatigue or degradation) and to have a method to determine whether a die has certain characteristics or attributes which provides for a relatively long "operating life" for that die. It is further and highly desirable to provide a test which enables a user of dies to determine whether a die has these certain characteristics and attributes before it is employed by the user in the production of parts or components.

SUMMARY OF THE INVENTION

It is a first object of the present invention to provide a method for qualifying material for use in the construction of a die which is effective to allow a die to be manufactured, and which has certain desirable attributes and characteristics that allow a die to be manufactured having a relatively long operating life.

It is a second object of the invention to provide a method for determining whether a die has these certain desirable operating life attributes and characteristics.

It is a third object of the invention to provide a method for determining whether the material used in the creation of a die has certain desirable operating life attributes and characteristics by the use of dynamically configurable material property data.

According to a first aspect of the present invention a method for qualifying material for use in the construction of a die is provided. The method includes the steps of acquiring first material from a supplier; determining the toughness of the first material; identifying the presence and amount of at least one constituent within the first material; acquiring second material from the supplier; identifying the presence and amount of the at least one constituent within the acquired second material only if the toughness of the first material exceeds a certain value; and utilizing the second material only if the amount of said at least one constituent within the second material is substantially similar to said at least one constituent within said first material.

According to a second aspect of the present invention, a method for obtaining material from a supplier is provided. The method includes the steps of obtaining a first material from the supplier; creating certain evaluation values by use of the first material; obtaining second material from the supplier; and evaluating the second material by use of the evaluation values.

These and other features, aspects, and advantages of the invention will become apparent from a consideration of the following detailed description of the preferred embodiment of the invention and by reference to the attached drawings.

DETAILED DESCRIPTION OF THE PREFERRED EMBODIMENT OF THE INVENTION

Figure 1:
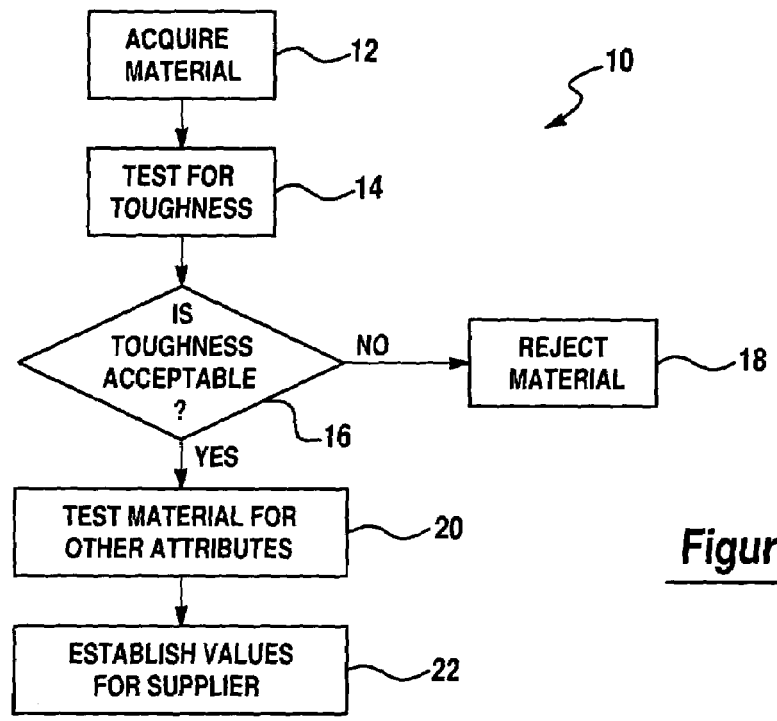
FIG. 1 is a flow chart illustrating the material qualifying methodology of the preferred embodiment of the invention.

Referring now to FIG. 1, there is shown a flowchart 10 which illustrates the sequence of steps included within the die material qualifying methodology of the preferred embodiment of the invention. As shown, the die material qualifying methodology 10 begins with an initial step 12 in which material is acquired from a supplier who desires to provide dies or die material to a user or to a die supplier and/or die manufacturer.

Step 14 follows step 12 and, in this step, the acquired material is tested in order to ascertain the "toughness" (i.e., resistance to structural fatigue) of the provided material. Toughness has been found to be an important attribute or characteristic of the material since relatively "tough" materials generally have a relatively long operating life. Hence, in the preferred embodiment of the invention, the supplied material must generally exhibit a certain toughness attribute or characteristic in order for it to be used in the creation of a die.

The material toughness attribute is therefore a threshold "filter" with which to initially identify undesirable materials and suppliers. As is further and more completely delineated below, material obtained from a supplier having a certain toughness is used as a benchmark with which to evaluate other and later obtained material from the same supplier. Hence, the evaluation criteria which is used to evaluate material from a supplier is dynamically configurable in that it emanates from or is based upon material previously provided by that supplier and is "tailored" to the specific supplier processes which initially produced acceptable material.

In one non-limiting embodiment, two portions of the initially acquired material from a supplier are subjected to a "Charpy V-notch impact test" in order to determine the toughness of the material. Particularly, the first portion is hardened by the use of a conventional laboratory processed oil quench and is triple tempered to the target hardness, while the second portion is quenched and tempered by use of the "production" workpiece or tool which will be used to create a die. Each portion is then subjected to at least three separate "Charpy V-notch impact" tests at each of the respective temperatures of 100, 212, 300, and 450 degrees Farenheit. Further tests in this non-limiting embodiment require each material portion to undergo about 15,000 "Dunker cycles" of testing without substantially evidencing cracking or structural fatigue, thereby evidencing the required material resistance to structural fatigue. In this non-limiting embodiment, the oil quenched specimen or material portion upon "passing" this toughness test, evidences the toughness of the material while the "machined and heat treated" material portion or specimen, upon "passing" this toughness test, evidences the acceptability of the heat treating process to which the production workpiece was subjected. In other non-limiting embodiments of the invention, a portion of the supplier provided material is further examined in order to determine whether the material is substantially free from "micro-banding" or alloy segregation. The determination is made in accordance with the published NADCA specification number 207-97 and the acceptable amount or threshold of microbanding which is utilized by the methodology 10 is set forth in this specification. In further non-limiting embodiments of the invention, yet another portion of the supplier provided material is analyzed in order to determine the grain size of the material. Particularly, the grain size is analyzed pursuant to the published NADCA 207-97 recommendation and the acceptable threshold size which is utilized by the methodology 10 is substantially the same size as published within this specification.

Step 16 follows step 14 and in this step, the user determines whether each sample of material "passed" the dunker testing (i.e. did not exhibit structural fatigue or cracking beyond the acceptance standard), and/or is substantially free from micro-banding, and/or has an acceptable grain size. If either material sample failed any of these previously delineated tests or analyses, step 16 is followed by step 18 in which the material is rejected for use in a die. Alternatively, step 16 is followed by step 20 in which yet another portion of the material is tested for other attributes or characteristics of the material which allow it to have the requisite toughness. These desired attributes and characteristics are evidenced by the presence and amount of certain constituent elements within the material.

Particularly, in step 20, a third portion of the obtained material is tested to determine the amount of carbon, manganese, phosphorous, sulfur, silicon, chromium, molybdenum, and vanadium which is present within the sample having or previously exhibiting the requisite toughness in the previously delineated manner. These elements have been found by the Applicant to cooperatively form a first "material signature" which represents desirable material from this supplier. These respective values or "material signature" then become the target or evaluation values which are later used to evaluate future provided samples of material from this supplier before that material is used in the construction of a die. Hence, in the preferred embodiment of the invention, material which is obtained from a certain supplier and which exhibits certain desired toughness attributes is used to generate or create certain evaluation values which are then used to evaluate future material from that supplier.

Further, in step 20, in a non-limiting embodiment, a portion of this supplier provided material is examined in order to determine the amount of non-metallic inclusions present within the material pursuant to the published "Method A" of the ASTME-45 specification and the carbide content of the material is ascertained pursuant to published NADCA 207-90 recommendations.

The inclusion content analysis, in one non-limiting embodiment of the invention, identifies the presence and amount of sulfide, aluminate, silicate, and globular oxides within the supplier provided and the examined material. The carbide content analysis determines the presence and the amount of carbide within the material.

In step 22, which follows step 20, the previously delineated inclusion content and carbide content cooperate with the previously delineated composition content to form a second material signature which is "tailored" to a specific material which is provided by a certain material supplier. Each supplier may have its own desired or acceptable material signature. The use of such "tailored" signatures obviates the need for an "artificial" threshold which each of the suppliers must meet and substantially prevent a supplier form being "disqualified" even if their respective supplied materials are in all other respects acceptable to the user. Hence, the use of these dynamically configurable or "tailored" material signatures allows a wide variety of material to be used in the die creation process, thereby reducing the overall die obtainment cost and improving the overall accuracy of the material selection process by substantially preventing the use of material which may meet some "artificial" standard but which fails to provide for the creation of a die with a relatively long operating life. Hence, all future material obtained from a supplier is evaluated by use of the material signature which was created in step 20 for that supplier. Hence, each supplier may have a unique material signature. A representative portion of a material signature created by step 20 is shown below:

| Alloy Chemical Composition | |
|---|---|
| Carbon | .35–.40 |
| Manganese | .40–.50 |
| Heavy | |
| Phosphorus | .020 Max |
| Sulfur | .003 Max |
| Silicon | .30–.50 |
| Chromium | 4.70–5.20 |
| Molybdenum | 2.70–3.00 |
| Vanadium | .50–.70 |

| Inclusion Content Inclusions | | |
|---|---|---|
| Type | Thin | |
| A (sulfide) | 0 | 0 |
| B (aluminate) | 1.0 | 0.5 |
| C (silicate) | 0 | 0 |
| D (globular oxides) | 1.0 | 0.5 |

Figure 2:
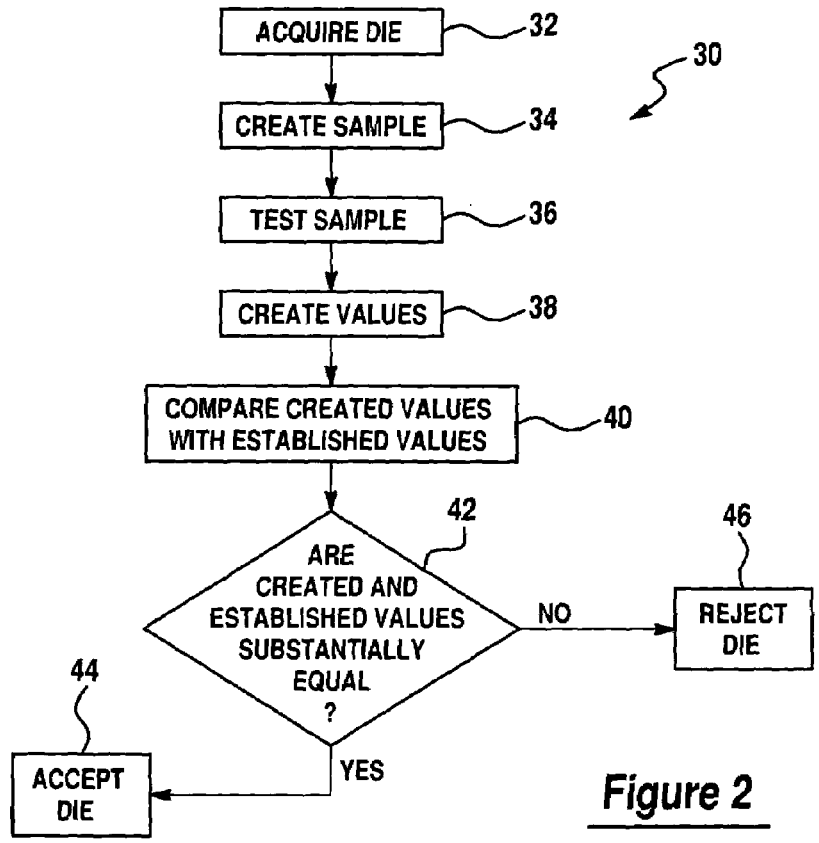
FIG. 2 is a flow chart illustrating the die qualifying methodology of the preferred embodiment of the invention.

Referring now to FIG. 2, there is shown a flowchart 30 which illustrates the steps associated with the decision to accept or reject a supplied die. Particularly, this process begins with step 32 in which the die is acquired by the user from a certain supplier. Step 34 follows step 32 and, in this step, a sample is taken from the acquired die. Step 36 follows step 34 and, in this step, the sample is tested in substantially the same manner as delineated above with respect to step 20. Step 38 follows step 36 and, in this step, values are created from this testing in substantially the same manner as delineated above with respect to step 20. Step 40 follows step 38 and, in this step, the values which are created in step 38 and which form a material signature are compared with the values which were created or with the material signature which was created in the material qualification process which has been previously described with respect to flowchart 10 of FIG. 1 for the supplier of that die. Step 42 follows step 40 and, in this step, the values are compared. If the values of the compared signatures are substantially similar, step 42 is followed by step 44 and the die is accepted for use. Alternatively, step 42 is followed by step 46 and the die is rejected.

It is to be understood that the invention is not limited to the exact construction and embodiment which has been previously described, but that various changes and modifications may be made without departing from the spirit and the scope of the invention as is more fully delineated in the claims.

What is claimed is:

1. A method for purchasing a die formed from a first material provided by a certain supplier, said method comprising the steps of:
   Obtaining a second material from said supplier;
   Creating a first material signature by use of said second material;
   Acquiring a sample of said die;
   Creating a second material signature by use of said sample;
   determining whether said first and second material signatures are substantially similar; and
   purchasing said die formed from said first material upon a determination that said first and second signatures are substantially similar;
   wherein said first material signature comprises an amount of carbon manganese, phosphorous, sulfur, silicon, chromium, molybdenum, and vanadium present within said second material;
   wherein said second material signature comprises an amount of carbon, manganese, phosphorous, sulfur, silicon, chromium, molybdenum, and vanadium present within said material; and
   wherein said second material has a certain toughness, said method further comprising the steps of:
   determining said toughness; and
   creating said first material signature only as said toughness is greater than a predetermined value.

2. The method of claim 1 wherein said first material signature further comprises an amount of sulfide, aluminate, silicate and globular oxides present within said second material.

3. The method of claim 2 wherein said second material signature further comprises an amount of sulfide, aluminate, silicate, and globular oxides present within said material.

4. A method for approving dies respectfully produced by a plurality of suppliers, said method comprising the step of:
   Obtaining material from each of said plurality of suppliers;
   Determining the presence and amount of certain constituents within each of said obtained materials, thereby creating a material signature for each of said plurality of suppliers;
   Obtaining a sample from each die;
   Determining the presence and amount of said certain constituents within each sample; and;
   Evaluating said dies by use of said material signatures and said presence and amount of said certain constituents;
   Further comprising the steps of testing the toughness of said obtained material; and only purchasing a die from a supplier of material which had a toughness which exceeded a predetermined value; and
   Wherein said certain constituents comprises of carbon, manganese, phosphorus, sulfur, silicon, chromium, molybdenum, and vanadium present within said second material.

5. The method of claim 4 further comprising the step of only purchasing a die form which a sample was taken which has the presence and amount of certain constituents equal to that which was found in at least one of said materials obtained from one of said plurality of suppliers.

6. The method of claim 4 further comprising the steps of determining the presence and amount of carbide with each of said samples, and only purchasing a die having a certain amount of carbide.

* * * * *